(12) United States Patent
Brachert et al.

(10) Patent No.: US 7,347,179 B2
(45) Date of Patent: Mar. 25, 2008

(54) METHOD FOR OPERATING AN INTERNAL COMBUSTION ENGINE

(75) Inventors: Götz Brachert, Stuttgart (DE); Rüdiger Herweg, Esslingen (DE); Kai Kanning, Stuttgart (DE); Matthias Pfau, Ludwigsburg (DE); Jochen Schäflein, Stuttgart (DE); Hans-Jürgen Weimann, Oppenweiler (DE)

(73) Assignee: Daimler Chrysler AG, Stuttgart (DE)

( * ) Notice: Subject to any disclaimer, the term of this patent is extended or adjusted under 35 U.S.C. 154(b) by 19 days.

(21) Appl. No.: 11/389,663

(22) Filed: Mar. 24, 2006

(65) Prior Publication Data

US 2006/0201479 A1 Sep. 14, 2006

Related U.S. Application Data

(63) Continuation-in-part of application No. PCT/EP2004/009707, filed on Sep. 1, 2004.

(30) Foreign Application Priority Data

Sep. 25, 2003 (DE) ................ 103 44 426

(51) Int. Cl.
F02B 3/04 (2006.01)
F02B 3/08 (2006.01)

(52) U.S. Cl. ............. 123/295; 123/90.15; 123/345; 123/568.14; 123/443

(58) Field of Classification Search ........... 123/295, 123/299–300, 305, 90.11, 90.15, 90.16, 90.17, 123/568.11, 568.14, 443, 345–348
See application file for complete search history.

(56) References Cited

U.S. PATENT DOCUMENTS

| | | | |
|---|---|---|---|
| 6,192,858 B1 * | 2/2001 | Nieberding | 123/323 |
| 6,213,086 B1 * | 4/2001 | Chmela et al. | 123/276 |
| 6,619,254 B2 * | 9/2003 | Chmela et al. | 123/276 |
| 6,736,106 B2 * | 5/2004 | Reitz et al. | 123/316 |
| 6,840,209 B2 * | 1/2005 | Shimazaki | 123/276 |
| 7,004,116 B2 * | 2/2006 | Allen | 123/27 R |
| 2001/0015192 A1 | 8/2001 | Urushihara et al. | |
| 2002/0046741 A1 | 4/2002 | Kakuho et al. | |
| 2003/0056750 A1 * | 3/2003 | Fuerhapter | 123/295 |
| 2003/0131805 A1 | 7/2003 | Yang | |
| 2006/0196467 A1 * | 9/2006 | Kang et al. | 123/305 |
| 2006/0196468 A1 * | 9/2006 | Chang et al. | 123/305 |
| 2006/0196469 A1 * | 9/2006 | Kuo et al. | 123/305 |
| 2006/0201476 A1 * | 9/2006 | Brachert et al. | 123/299 |
| 2006/0213193 A1 * | 9/2006 | Koopmans | 60/602 |

FOREIGN PATENT DOCUMENTS

| | | |
|---|---|---|
| DE | 195 19 663 | 5/1996 |
| DE | 198 18 596 | 11/1999 |
| DE | 198 18 596 | 4/2000 |
| DE | 198 52 552 | 10/2000 |
| EP | 1 052 391 | 11/2000 |
| EP | 1 138 896 | 10/2001 |
| EP | 1 365 134 | 9/2002 |
| EP | 1 310 649 | 5/2003 |

* cited by examiner

Primary Examiner—Hai Huynh
(74) Attorney, Agent, or Firm—Klaus J. Bach

(57) ABSTRACT

In a method for operating an internal combustion engine in which the angular locations where the fuel/air mix combustions takes place can be controlled by an adjustment of the inlet and outlet valve timing, the timing of at least one of the intake and exhaust valve opening phases is shifted depending on the engine speed so as to reduce engine emissions.

3 Claims, 3 Drawing Sheets

US 7,347,179 B2

METHOD FOR OPERATING AN INTERNAL COMBUSTION ENGINE

This is a Continuation-In-Part Application of international patent application PCT/EP2004/009707 filed Sep. 1, 2004 and claiming the priority of German Patent Application No. 103 44 426.2 filed Sep. 25, 2003.

BACKGROUND OF THE INVENTION

The invention relates to a method for operating an internal combustion engine wherein at partial engine load a lean base mixture of air and fuel is formed in the engine combustion chamber and ignited by compression ignition, and at full load a stoichiometric mixture is formed and ignited by spark ignition.

DE 195 19 663 A1 discloses a method for operating an internal combustion engine with spontaneous ignition, in which in a first stage a homogenous, pre-compressed fuel/air mix which is not suitable for spontaneous ignition is provided in the combustion chamber of the internal combustion engine, and in a second stage an additional quantity of the same fuel is injected into the working space in order to bring about the spontaneous ignition. In this case, the fuel/air mix is formed externally and introduced into the engine cylinder, where it is compressed close to the spontaneous ignition point. The injection of the additional quantity of fuel in the second stage takes place in finely atomized form, avoiding contact with wall, so as to form a mix cloud in which, on the one hand, the fuel/air ratio is no greater than the stoichiometric mixing ratio and in which, on the other hand, the spontaneous ignition is achieved.

Furthermore, DE 198 52 552 C2 discloses a method for operating a four-stroke internal combustion engine which, at part-load, forms a lean base mix from air, fuel and retained exhaust gas and, at full load, forms a stoichiometric mix. At part load, compression ignition takes place, whereas at full load spark ignition takes place. Furthermore, mechanically controlled exhaust-gas retention with switchable valve closure overlap and exhaust gas throttling is provided. An activation fuel amount may be injected into the retained exhaust gas. The quantity of retained exhaust gas, with the valve closure overlap switched on, is controlled or preset as a function of the engine speed and engine load by an exhaust-gas throttle valve which is active for all the combustion chambers. Upon opening of the intake valves of the individual cylinders the pressure in the various combustion chambers is equalized by a cylinder-selective, cycle-consistent activation injection.

A method for operating a four-stroke, reciprocating-piston internal combustion engine is also known from DE 198 18 569 C2. It is characterized by a homogenous, lean base mix of air, fuel and retained exhaust gas and by compression ignition and direct injection of the fuel into the combustion chamber. The volume of the combustion chamber changes cyclically. The combustion chamber can be filled with fresh gas through at least one intake valve, while the combustion exhaust gases can be at least partially expelled through at least one exhaust valve. In the part-load range and in the lower full-load range, the internal combustion engine is operated with compression ignition and preferably mechanically controlled exhaust-gas retention, whereas in the full-load range and high part-load range it is operated by spark ignition.

One drawback of the methods disclosed in the above-mentioned documents is in particular that the temperature of the exhaust gas and the composition of the working gas change when the engine speed changes. The reactivity, that is the ignitability of the mix during compression ignition, is likewise altered as a result even to the extent of causing misfires if the operating gas temperatures are too low.

It is therefore an object of the invention to provide a method for operating an internal combustion engine in which changes in the reactivity, that is, the ignitability of the mix in the event of changes in engine speed can be taken into account and/or corrected.

SUMMARY OF THE INVENTION

In a method for operating an internal combustion engine in which the angular locations where the fuel/air mix combustions takes place can be controlled by an adjustment of the inlet and outlet valve timing, the timing of at least one of the intake and exhaust valve opening phases is shifted depending on the engine speed so as to reduce engine emissions.

The method according to the invention is distinguished in that, with an increase in engine speed, a principle-based shift in the combustion toward early is corrected by shifting the intake and/or exhaust valve opening phases. A targeted change in the control times of this nature allows changes in the temperature of the operating gas and the operating gas composition in the event of engine speed changes to be effectively corrected.

In the event of a reduction in the engine speed, either the intake phase can be shifted toward early or the exhaust phase can be shifted toward late, or the two phase-shift procedures can be both carried out simultaneously, in which case the effects are cumulative.

The invention will become more readily apparent from the following description thereof with reference to the accompanying drawings:

DESCRIPTION OF THE INVENTION

Figure 1:
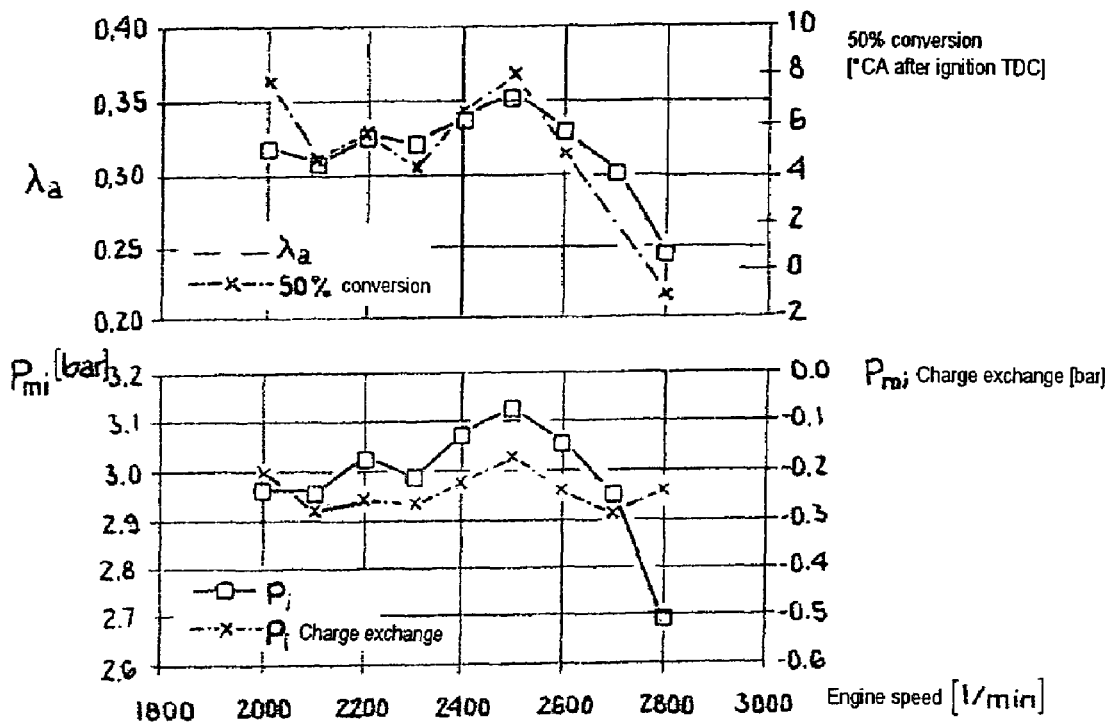
FIG. 1 shows a diagram showing the supply of air, 50% conversion and indicated mean effective pressure as a function of the engine speed.

A major factor behind research and development in internal combustion engines is the desire to improve fuel consumption while, at the same time, reducing emissions. In the case of spark ignited internal combustion engines, in particular alternative load control methods are recommended to increase the part-load efficiency. The most important development trends concern the stratified direct fuel injection engine, which, with the aid of quality control, moves the spark ignited internal combustion engine principle closer to the spontaneously igniting internal combustion engine principle (diesel engine). This is made possible by the variable valve gear combined with residual gas strategies, which are intended to limit charge exchange losses. Both methods theoretically promise major benefits but are thwarted in one case by the expensive after-treatment of the exhaust gas from the super-stoichiometric mix and in the other case by the limited residual gas compatibility of spark ignited internal combustion engines. The ideal is a link between these two methods: a quality-controlled internal combustion engine with high residual gas content and spontaneous ignition, which on account of homogenous combustion in super-stoichiometric operation emits very little if any nitrogen oxide.

One factor of homogeneous combustion methods is the spontaneous ignition time, which is determined by the temperature or mix composition. If the required charging temperatures are obtained with the aid of exhaut-gas retention, more specifically by means of the parameters exhaust-gas temperature and quantity, the combustion location of the cycle n is dependent on the preceding cycle (n–1); the required spontaneous ignition temperature is not reached in extreme circumstances. The combustion location for its part is the determining factor for the target variables of the internal combustion engine and therefore must have values which are defined as a function of load and engine speed.

It is the object of the present invention to provide ways of implementing changes in exhaust-gas quantity and temperature as they are required during a change of the operating point within part-load operation in which ignition combustion takes place without adversely affecting the combustion.

Exhaust-gas retention can in principle be achieved with the aid of suitable valve control times. This requires firstly early closing of the exhaust valve, in order to keep the required quantity of residual exhaust gas in the combustion chamber of the internal combustion engine. To prevent the hot exhaust gas from flowing back into the induction pipe, with ensuing cooling effects and charge losses, the opening of the intake valve is delayed. However, this concept cannot be applied to conventional spark ignited internal combustion engines without further measures.

If the valve closure overlap is made sufficiently variable, the first control concept for this form of providing the required temperature is obtained. The requirement for an independent high-pressure part and therefore optimum charging in this case, however, requires the use of a fully variable valve drive mechanism with which valve opening and closing times can be adjusted independently of one another.

With conventional camshafts the setting of a defined exhaust-gas retention rate is generally performed by the camshaft controllers which are already in widespread use. As an undesirable side-effect, with a rigid cam contour, the angle at which the valve opens changes with the angle at which the valve closes, which leads to charging and efficiency losses and not least to a restricted operating range in terms of load and engine speed.

In addition to the control of the temperature at the end of compression with the aid of the exhaust-gas retention rate or quantity, the use of the direct fuel injection and the operation of the internal combustion engine with excess air also influences the operating gas temperature and/or the mix composition of the fuel. The effect of the direct injection can in this case be divided into two mechanisms: firstly, a thermal effect, which provides an increase in the exhaust-gas temperature as a result of the conversion of the pre-injected fuel, and secondly a preconditioning of the fuel, which increases the reactivity of the latter and therefore influences the integral ignition delay.

To determine the influence of the engine speed on the compression ignition combustion, starting from a reference point of the internal combustion engine (2000 rpm and 3 bar $p_{mi}$), the engine speed is increased with otherwise constant boundary conditions.

FIG. 1 shows the air supply, the 50% conversion and the indicated mean effective pressure as a function of the engine speed. Initially, the supply of air remains undifferentiated, since the combustion chamber charge only decreases significantly at high engine speeds. The combustion position fluctuates with the variation in the air supply and ultimately shifts in the early direction at high engine speeds. The indicated mean effective pressure initially rises by the same amount by which the charge exchange work decreases, as evidenced by the indicated charge exchange mean effective pressure. Only if the combustion location is too early and therefore unfavorable in terms of efficiency does the indicated mean effective pressure drop with an increase in the engine speed.

Figure 2:
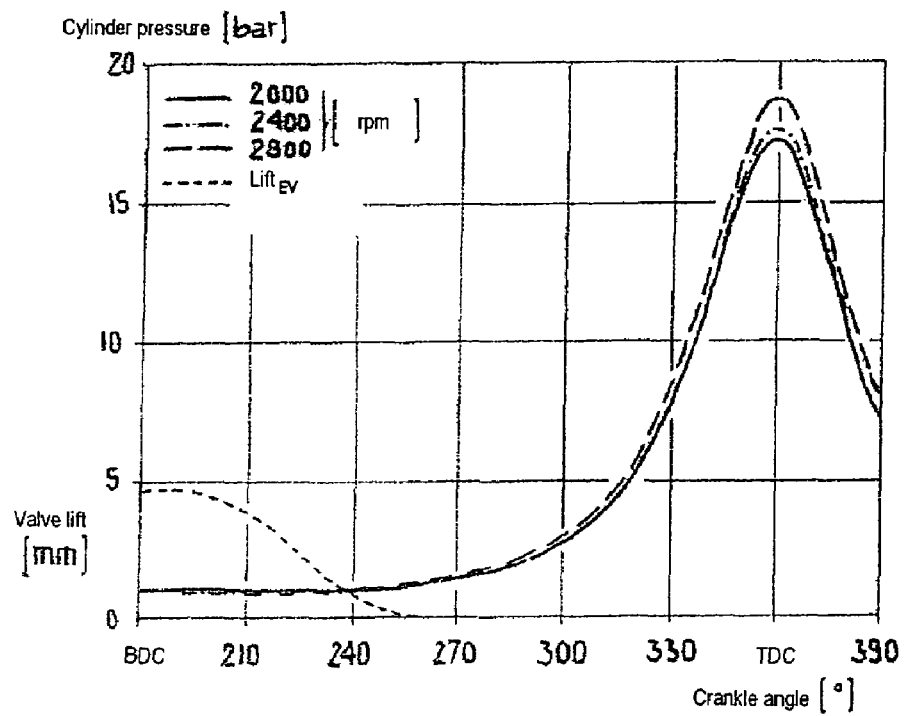
FIG. 2 shows a graph illustrating the cylinder pressure and valve-lifting curve during the intermediate compression for various engine speeds.

With increasing engine speed, more exhaust gas remains in the combustion chamber, as evidenced by the rising maximum pressure in the intermediate compression that can be seen from FIG. 2. Moreover, the lower wall heat transfer results in higher exhaust-gas temperatures.

Figure 3:
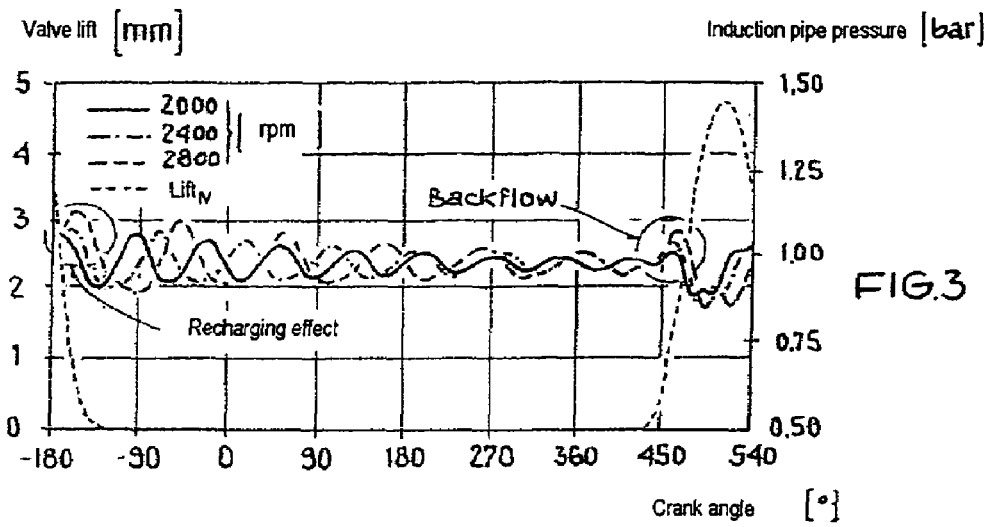
FIG. 3 shows a graph illustrating the induction pipe pressure and the valve-lifting curve during the intermediate compression for various engine speeds.

The higher pressure level in the intermediate compression leads to a rising backflow of exhaust gas into the induction pipe when the intake valve opens. this backflow manifests itself as an increase in the induction pipe pressure, as can be seen from FIG. 3. At the same time, a reflected excess pressure wave occurs near to the time at which the intake valve closes. Its maximum, with the engine configuration shown at an engine speed of approx. 2400 to 2500 rpm, lies precisely at the point at which the intake valve is closed and therefore leads to a dynamic recharging effect, which makes it possible to understand the profile of the air supply in FIG. 1. The fact that the combustion is considerably affected by such events, which tend to appear unimportant during part-load operation of spark ignited internal combustion engines, is important. This needs to be taken into account when designing the air induction system.

If, at the selected reference point of 2000 rpm and 3 bar $p_{mi}$ and a constant injection mass, the phase positions of intake and exhaust camshaft are now altered, the effect of primary influencing parameters, such as for example the valve control times, will be immediately apparent.

Figure 4:
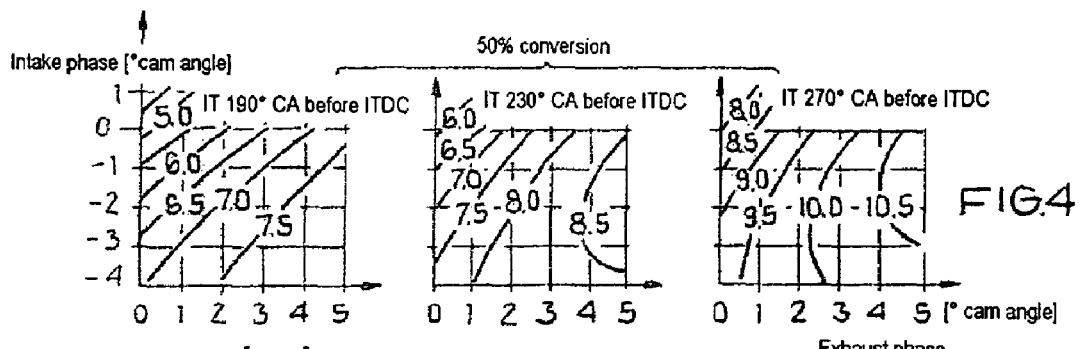
FIG. 4 shows a diagram illustrating the combustion position as a function of intake and exhaust phase for various injection points.

FIG. 4 diagrammatically depicts the combustion location as a function of intake and exhaust phase.

Accordingly, an adjustment of the exhaust valve in the exhaust phase toward early causes a shift in the combustion location in the early direction. A retarded intake phase likewise leads to a shift in the combustion toward early to approximately the same extent. In the event of simultaneous adjustment of the phase locations, the effect is doubled.

Therefore, the control times of intake and exhaust valves should not be considered separately from one another, but rather have an influence on one another.

Figure 5:
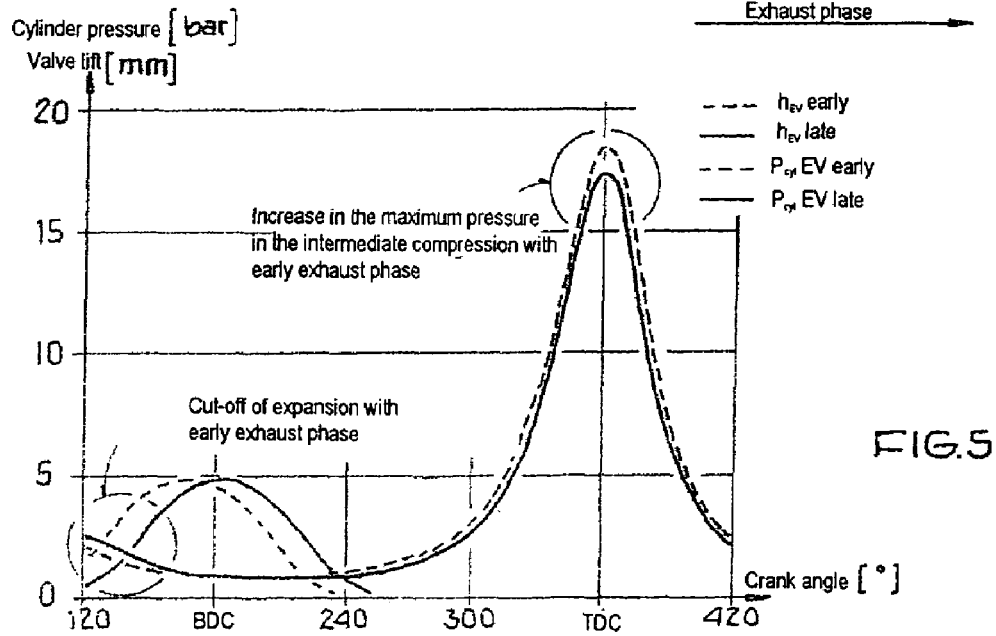
FIG. 5 shows a graph illustrating the cylinder pressure in the intermediate compression as a function of the exhaust phase.

If the crankshaft angle-based indexing data as shown in the diagram illustrated in FIG. 5 are considered, it will be possible to explain the shift in the combustion location.

Figure 6:
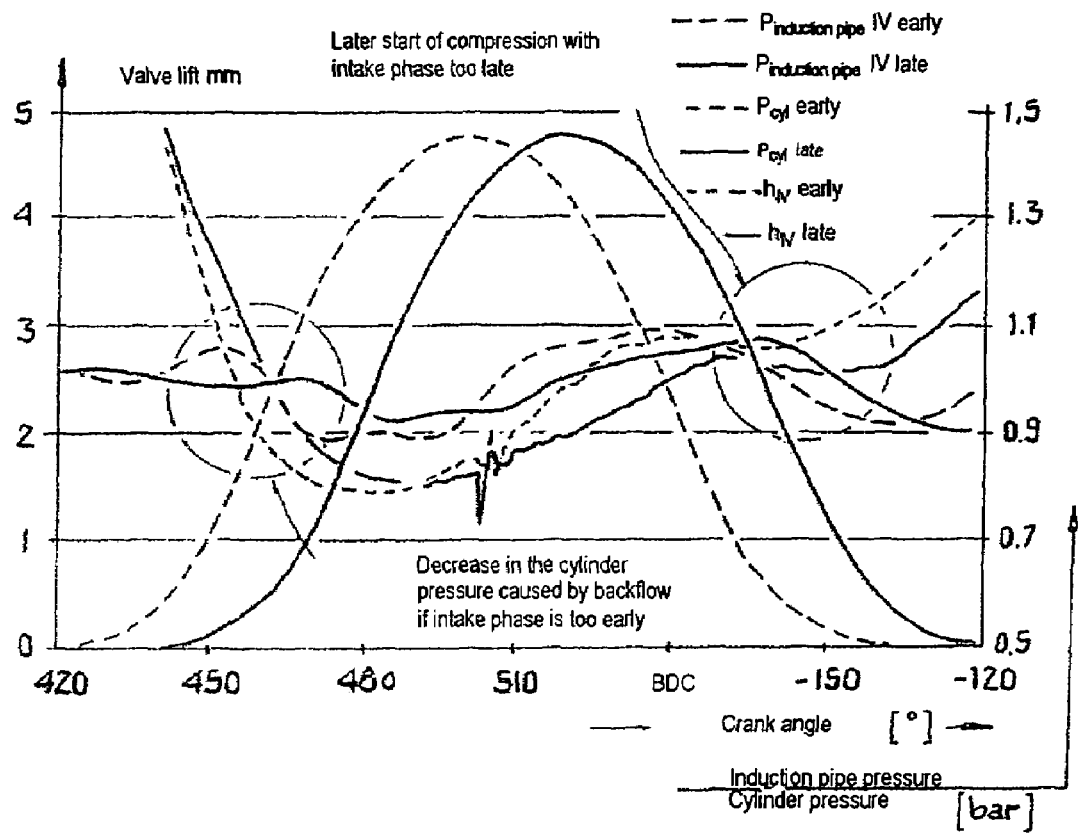
FIG. 6 shows a graph illustrating the cylinder pressure and the induction pipe pressure during the induction phase as a function of the intake phase.

The figure illustrates the rise in the cylinder pressure during the intermediate compression with earlier closing of the exhaust valve. Because of the higher residual gas content, the gas temperature in the compression phase rises, and accordingly combustion begins earlier. However, the increase in the maximum pressure at the gas exchange dead center is relatively low compared to a shift in the closing of the exhaust valve of a fully variable valve drive. On account of the rigid cam contour, earlier closing of the exhaust valve also leads to a shift in the opening angle of the exhaust valve, cutting off the expansion. With the opening of the valves at an ever higher back pressure, already in this phase more exhaust gas flows out of the combustion chamber of the internal combustion engine. There are two limit scenarios for the shift in the intake phase, as can be seen from FIG. 6. On the one hand, exhaust gas flows back out of the combustion chamber into the induction pipe if the intake valve opens too early. This leads to an excessive rise in pressure in the induction pipe and to a decrease in pressure in the combustion chamber. The other limit situation results from the intake valve closing too late. In this case, charge losses occur since part of the cylinder charge which has just been drawn into the cylinder is discharged, which leads to a reduction in the effective compression.

Figure 7:
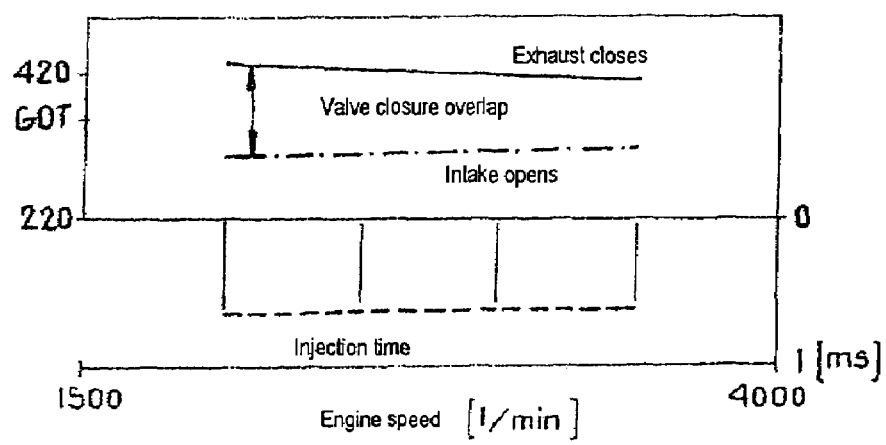
FIG. 7 shows a diagram illustrating the adjustment strategy for a change in engine speed with a constant indicated mean effective pressure.

FIG. 7 diagrammatically depicts an engine speed change strategy only with the aid of the phase locations of the two camshafts, without altering the indicated mean effective pressure. The wall heat transfer per working cycle, which drops as the engine speed rises, leads to an increased temperature level in the internal combustion engine. To keep the combustion location constant, consequently, more exhaust gas can be discharged from the combustion chamber, i.e. the valve closure overlap can be reduced. The improvement in efficiency brought about by the decreasing wall heat losses has to be compensated for by a reduction in the fuel injection quantity. In this case, it is not really reasonable to keep the indicated load constant under real driving conditions by the friction mean effective pressure which rises with the engine speed. In the event of a change in engine speed, a change in the valve closure overlap can be realized by the hydraulic camshaft actuators, since this operation is relatively slow.

What is claimed is:

1. A method for operating a four-stroke internal combustion engine having at least one cylinder with a cyclically changing combustion chamber volume and at least one inlet valve and at least one outlet valve, said method comprising the following steps:

injecting fuel directly into the at least one combustion chamber of the internal combustion engine, supplying to said combustion chamber fresh gas through said at least one intake valve and discharging combustion exhaust gas through said at least one exhaust valve, forming, at part-load operation of said engine, a lean base mix of air, fuel and retained exhaust gas, and forming, at full load a stoichiornetric fuel/air mix, compressing the mixture so as to initiate compression ignition at part-load operation of the engine and providing for spark ignition during full load engine operation, and correcting in the part-load operating range of the engine, in the event of an increase in engine speed, a principle-based shift of the combustion toward early by a shift in the phase location of at least one of the intake and the exhaust phase provided by the intake and exhaust valves.

2. The method as claimed in claim 1, wherein, in the part-load range, in the event of an increase in engine speed, the combustion is shifted toward late by adjusting the exhaust phase in the late direction, with the exhaust valve opening being retarded.

3. The method as claimed in claim 1, wherein, in the part-load range, in the event of an increase in engine speed, the combustion is shifted toward late by advancing the intake phase with the intake valve being opened earlier.

\* \* \* \* \*